Patented Feb. 14, 1939

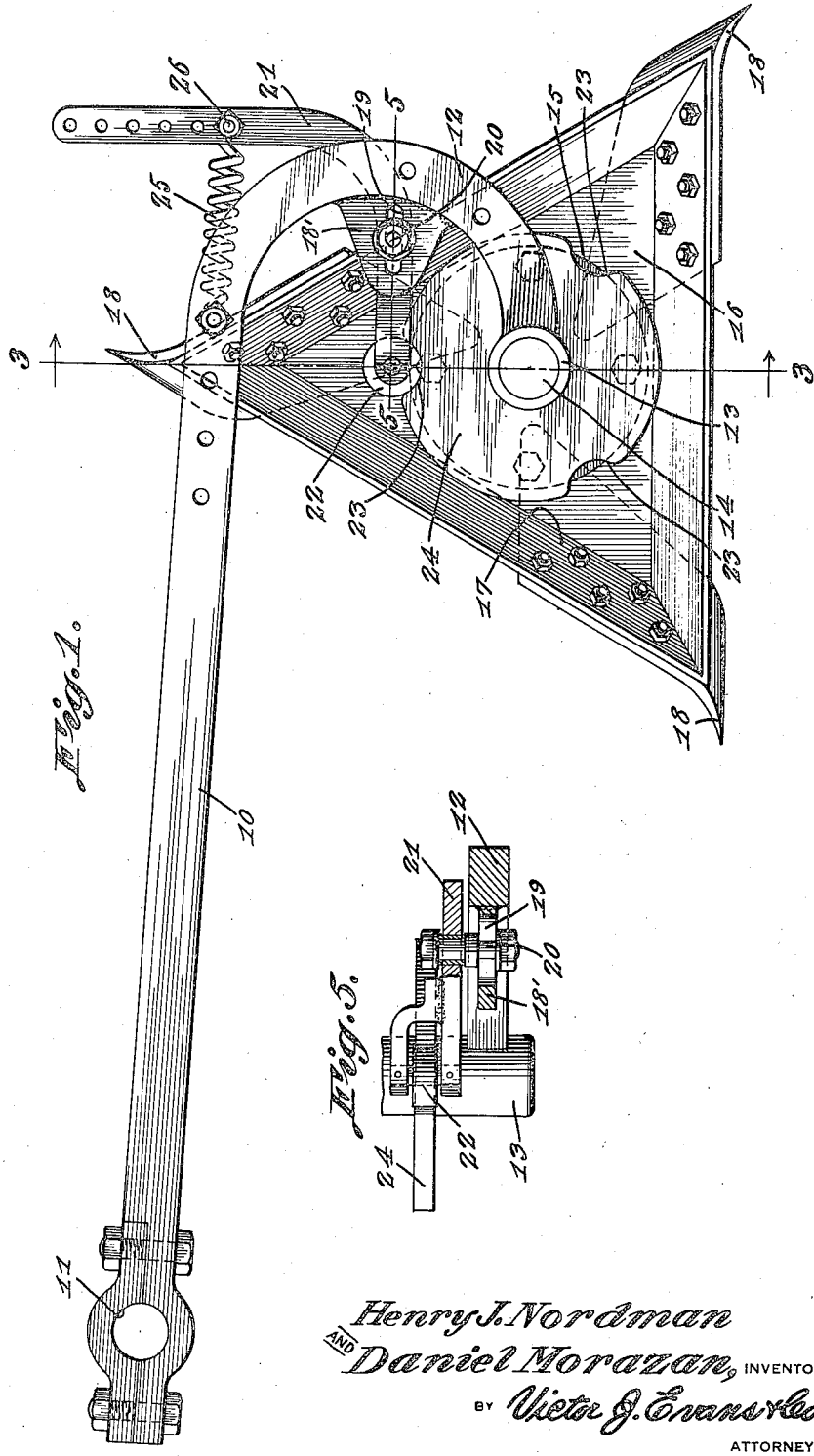

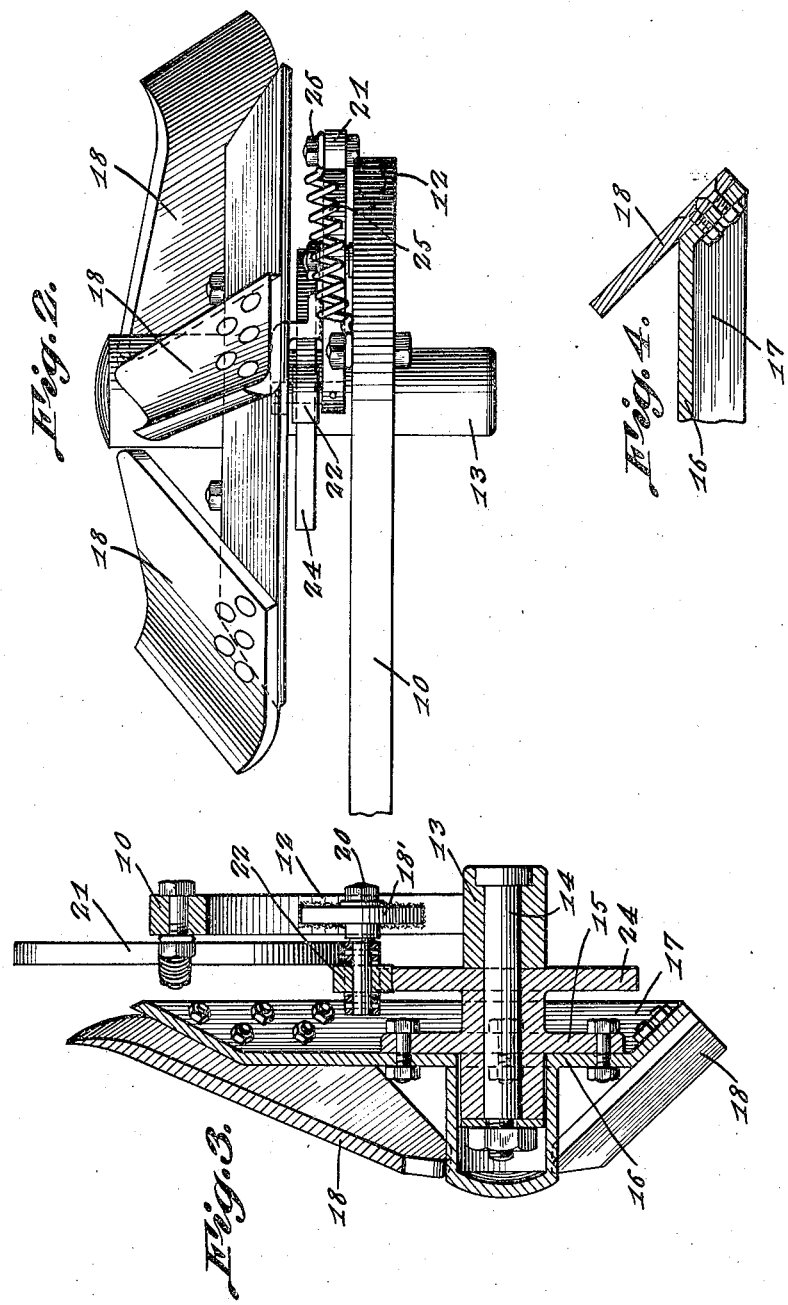

2,146,757

UNITED STATES PATENT OFFICE 2,146,757

PLOW

Henry J. Nordman and Daniel Morazan,
New Orleans, La.

Application September 22, 1937, Serial No. 165,192

5 Claims. (Cl. 97—183)

The invention relates to a plow and more especially to a multiple blade trip plow.

The primary object of the invention is the provision of a plow of this character, wherein the blades or ground working members are distributed about a rotor and these blades can be selectively brought into working position on the rotation of said rotor and should an active blade meet an obstruction the said blade will readily trip and thereby eliminate damage to such blade in the working of the plow.

Another object of the invention is the provision of a plow of this character, wherein the construction thereof is novel in its entirety and is susceptible of ready and easy adjustment for bringing varying shares or blades into action, being light in weight and easy of adjustment.

A further object of the invention is the provision of a plow of this character, which is simple in its construction, thoroughly reliable and efficient in operation, strong, durable, being relieved of jamming and avoids plowing interruption and is susceptible of single, double or group plowing and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side elevation of a plow constructed in accordance with the invention.

Figure 2 is a fragmentary top plan view thereof.

Figure 3 is a sectional view on the line 3—3 of Figure 1 looking in the direction of the arrows.

Figure 4 is a fragmentary detail horizontal sectional view through one of the plow blades.

Figure 5 is a sectional view on the line 5—5 of Figure 1.

Similar reference characters indicate corresponding parts throughout the several views in the drawings.

Referring to the drawings in detail, the plow comprises a draw bar or beam 10 having a forward coupling end 11 so that it can be separably joined with a draft medium while the aft portion of said bar or beam has the downwardly and forwardly curved standard 12 provided with a bearing 13 for an axle 14 of a rotor 15 of substantially disk form. Bolted or otherwise secured to the rotor 15 is a substantially triangular shaped blade carrier 16 being dished at 17 and at its three corners are detachably mounted plow shares or blades 18, these being susceptible of individual activity and are selectively engageable in the ground for plowing purposes.

The standard has formed thereon a pivot ear 18' having an elongated slot 19 receiving an adjusting pivot bolt 20 for a swinging substantially L-shaped latching lever 21, it having a latching roller 22 journaled thereon and this roller is accommodated within notches 23 therefor provided in the periphery of a keeper disk or wheel 24 constituting a part of the rotor 15 and in this manner a plow share or blade 18 will be latched in ground working position.

Fixed to the beam or bar 10 is a coiled retractile spring 25 which is adjustably connected at 26 to the upstanding portion of the lever 21 and this spring functions to frictionally hold the latching roller 22 seated in a notch 23 yet permits the tripping of a blade when in working position for overriding an obstruction in the path thereof to avoid damage to the blade.

In one implement a single triple blade plow, as before described, may be used or a gang of the same for single, double and triple plowing operation.

The plow is advanced in the use thereof by any suitable power source.

What is claimed is:

1. A plow of the kind described comprising a draw beam having a rear depending standard, a vertically arranged rotor journaled in the standard at one side thereof for turning upon a horizontal axis, a substantially triangular shape dished carrier separably fitted with said rotor, blades separably fixed to the carrier at the corners thereof and disposed laterally at an angle to the vertical disposition of said rotor and having outward laterally curved cutting edges, a keeper wheel movable with the rotor and having peripheral notches forming seats, and self-released latching means carried by the standard for selectively holding a share in working position and automatically releasing the rotor upon the share meeting an obstruction.

2. A plow of the kind described comprising a draw beam having a rear depending standard, a vertically arranged rotor journaled in the standard at one side thereof for turning upon a horizontal axis, a substantially triangular shape dished carrier separably fitted with said rotor, blades separably fixed to the carrier at the corners thereof and disposed laterally at an angle to the vertical disposition of said rotor and having outward laterally curved cutting edges, a keeper wheel movable with the rotor and having peripheral notches forming seats, self-released latching means carried by the standard for selectively holding a share in working position and automatically releasing the rotor upon the share meeting an obstruction, and means acting upon the latching means for effecting self-releasing thereof from the notches in said rotor.

3. A plow of the kind described comprising a draw beam having a rear depending standard, a vertically arranged rotor journaled in the standard at one side thereof for turning upon a horizontal axis, a substantially triangular shape dished carrier separably fitted with said rotor, blades separably fixed to the carrier at the corners thereof and disposed laterally at an angle to the vertical disposition of said rotor and having outward laterally curved cutting edges, a keeper wheel movable with the rotor and having peripheral notches forming seats, self-released latching means carried by the standard for selectively holding a share in working position and automatically releasing the rotor upon the share meeting an obstruction, means acting upon the latching means for effecting self-releasing thereof from the notches in said rotor, a hub formed on the rotor for its journal and extended through the carrier, and a cap on said carrier and receiving the hub of the rotor and the journal therefor.

4. A plow of the kind described comprising a draw beam having a rear depending standard, a vertically arranged rotor journaled in the standard at one side thereof for turning upon a horizontal axis, a substantially triangular shape dished carrier separably fitted with said rotor, blades separably fixed to the carrier at the corners thereof and disposed laterally at an angle to the vertical disposition of said rotor and having outward laterally curved cutting edges, a keeper wheel movable with the rotor and having peripheral notches forming seats, self-released latching means carried by the standard for selectively holding a share in working position and automatically releasing the rotor upon the share meeting an obstruction, means acting upon the latching means for effecting self-releasing thereof from the notches in said rotor, a hub formed on the rotor for its journal and extended through the carrier, and a cap on said carrier and receiving the hub of the rotor and the journal therefor, the said carrier being fitted with the rotor for confinement thereof within the dished area of said carrier.

5. A plow of the kind described comprising a draw beam having a rear depending standard, a vertically arranged rotor journaled in the standard at one side thereof for turning upon a horizontal axis, a substantially triangular shape dished carrier separably fitted with said rotor, blades separably fixed to the carrier at the corners thereof and disposed laterally at an angle to the vertical disposition of said rotor and having outward laterally curved cutting edges, a keeper wheel movable with the rotor and having peripheral notches forming seats, self-released latching means carried by the standard for selectively holding a share in working position and automatically releasing the rotor upon the share meeting an obstruction, means acting upon the latching means for effecting self-releasing thereof from the notches in said rotor, a hub formed on the rotor for its journal and extended through the carrier, a cap on said carrier and receiving the hub of the rotor and the journal therefor, the said carrier being fitted with the rotor for confinement thereof within the dished area of said carrier, and means on the standard for adjustable mounting of the latching means in association therewith.

HENRY J. NORDMAN.
DANIEL MORAZAN.